(12) United States Patent
Levin et al.

(10) Patent No.: US 10,664,590 B2
(45) Date of Patent: May 26, 2020

(54) FILESYSTEM ACTION PROFILING OF CONTAINERS AND SECURITY ENFORCEMENT

(71) Applicant: Twistlock, Ltd., Herzliya (IL)

(72) Inventors: Liron Levin, Herzliya (IL); Dima Stopel, Herzliya (IL); Eran Yanay, Tel-Aviv (IL)

(73) Assignee: TWISTLOCK, LTD., Herzliya (IL)

( * ) Notice: Subject to any disclaimer, the term of this patent is extended or adjusted under 35 U.S.C. 154(b) by 145 days.

(21) Appl. No.: 15/865,763

(22) Filed: Jan. 9, 2018

(65) Prior Publication Data

US 2018/0129803 A1 May 10, 2018

Related U.S. Application Data

(63) Continuation-in-part of application No. 15/397,230, filed on Jan. 3, 2017, which is a continuation-in-part (Continued)

(51) Int. Cl.
*G06F 21/00* (2013.01)
*G06F 21/52* (2013.01)
(Continued)

(52) U.S. Cl.
CPC .............. *G06F 21/52* (2013.01); *G06F 21/54* (2013.01); *G06F 21/552* (2013.01);
(Continued)

(58) Field of Classification Search
None
See application file for complete search history.

(56) References Cited

U.S. PATENT DOCUMENTS 6,490,620 B1 12/2002 Ditmer et al.
6,502,102 B1 12/2002 Haswell et al.
(Continued)

OTHER PUBLICATIONS

Azkia, Hanieh et al. Reconciling IHE-ATNA Profile with a posteriori Contextual Access and Usage Control Policy in Healthcare Environment. 2010 Sixth International Conference on Information Assurance and Security. https://ieeexplore.ieee.org/stamp/stamp.jsp?tp=&arnumber=5604060 (Year: 2010).*

(Continued)

*Primary Examiner* — Jeremiah L Avery
(74) *Attorney, Agent, or Firm* — M&B IP Analysts, LLC

(57) ABSTRACT

A system and method for securing execution of software containers using security profiles. The method includes receiving an event indicating that a container image requires profiling, wherein the container image includes resources utilized to execute a corresponding application container; generating a security profile for the container image when the event is received, wherein the generated security profile indicates at least a list of permissible filesystem actions, wherein each permissible filesystem action is an action performed with respect to at least one filesystem resource; monitoring an operation of a runtime execution of the application container; and detecting a violation of the security profile based on the monitored operation.

18 Claims, 6 Drawing Sheets

Related U.S. Application Data of application No. 15/278,700, filed on Sep. 28, 2016, and a continuation-in-part of application No. 15/292,915, filed on Oct. 13, 2016, now Pat. No. 10,223,534.

(60) Provisional application No. 62/274,420, filed on Jan. 4, 2016, provisional application No. 62/274,798, filed on Jan. 5, 2016, provisional application No. 62/235,644, filed on Oct. 1, 2015, provisional application No. 62/235,641, filed on Oct. 1, 2015, provisional application No. 62/241,812, filed on Oct. 15, 2015.

(51) Int. Cl.
    *G06F 21/55* (2013.01)
    *G06F 21/54* (2013.01)
    *G06N 20/00* (2019.01)

(52) U.S. Cl.
    CPC ...... *G06F 21/554* (2013.01); *G06F 2221/034* (2013.01); *G06F 2221/2141* (2013.01); *G06N 20/00* (2019.01)

(56) References Cited

U.S. PATENT DOCUMENTS

| | | | |
|---|---|---|---|
| 6,523,027 B1 | 2/2003 | Underwood | |
| 6,704,873 B1* | 3/2004 | Underwood | H04L 63/02 709/223 |
| 6,732,162 B1 | 5/2004 | Wood et al. | |
| 7,100,195 B1 | 8/2006 | Underwood | |
| 7,103,740 B1 | 9/2006 | Colgrove et al. | |
| 7,577,848 B2 | 8/2009 | Schwartz et al. | |
| 7,596,227 B2 | 9/2009 | Illowsky et al. | |
| 7,640,235 B2 | 12/2009 | Shulman et al. | |
| 7,698,741 B2 | 4/2010 | Marinescu et al. | |
| 7,743,420 B2 | 6/2010 | Shulman et al. | |
| 7,752,662 B2 | 7/2010 | Shulman et al. | |
| 7,752,669 B2 | 7/2010 | Palliyil et al. | |
| 7,779,468 B1 | 8/2010 | Magdych et al. | |
| 7,861,303 B2 | 12/2010 | Kouznetsov et al. | |
| 7,882,542 B2 | 2/2011 | Neystadt et al. | |
| 8,024,804 B2 | 9/2011 | Shulman et al. | |
| 8,051,484 B2 | 11/2011 | Shulman et al. | |
| 8,056,141 B2 | 11/2011 | Shulman et al. | |
| 8,108,933 B2 | 1/2012 | Mahaffey | |
| 8,135,948 B2 | 3/2012 | Shulman et al. | |
| 8,181,246 B2 | 5/2012 | Shulman et al. | |
| 8,302,192 B1 | 10/2012 | Cnudde et al. | |
| 8,316,237 B1 | 11/2012 | Felsher et al. | |
| 8,510,571 B1 | 8/2013 | Chang et al. | |
| 8,621,613 B1 | 12/2013 | McClintock et al. | |
| 8,639,625 B1* | 1/2014 | Ginter | G06F 21/10 705/50 |
| 8,677,472 B1 | 3/2014 | Dotan et al. | |
| 8,756,683 B2 | 6/2014 | Manion et al. | |
| 8,806,625 B1 | 8/2014 | Berger | |
| 8,966,629 B2 | 2/2015 | Sallam | |
| 9,003,141 B2* | 4/2015 | Nielsen | G06F 11/1438 711/162 |
| 9,098,333 B1 | 8/2015 | Obrecht et al. | |
| 9,203,862 B1 | 12/2015 | Kashyap et al. | |
| 9,223,966 B1 | 12/2015 | Satish et al. | |
| 9,256,467 B1 | 2/2016 | Singh et al. | |
| 9,355,248 B1 | 5/2016 | Wiest et al. | |
| 9,401,922 B1 | 7/2016 | Walters | |
| 9,594,590 B2 | 3/2017 | Hsu | |
| 9,904,781 B2 | 2/2018 | Martini et al. | |
| 9,928,379 B1* | 3/2018 | Hoffer | G06F 21/6245 |
| 10,223,534 B2 | 3/2019 | Stopel et al. | |
| 2001/0007131 A1 | 7/2001 | Galasso et al. | |
| 2003/0014629 A1 | 1/2003 | Zuccherato | |
| 2003/0079145 A1 | 4/2003 | Kouznetsov et al. | |
| 2003/0120593 A1* | 6/2003 | Bansal | G06Q 20/10 705/39 |
| 2003/0229801 A1 | 12/2003 | Kouznetsov et al. | |
| 2003/0233566 A1 | 12/2003 | Kouznetsov et al. | |
| 2003/0233574 A1 | 12/2003 | Kouznetsov et al. | |
| 2004/0133793 A1 | 7/2004 | Ginter et al. | |
| 2005/0120054 A1 | 6/2005 | Shulman et al. | |
| 2005/0177715 A1 | 8/2005 | Somin et al. | |
| 2006/0075494 A1 | 4/2006 | Beaman et al. | |
| 2006/0230451 A1* | 10/2006 | Kramer | G06F 21/51 726/22 |
| 2006/0282664 A1 | 12/2006 | Zhao | |
| 2006/0288420 A1* | 12/2006 | Mantripragada | G06F 21/51 726/25 |
| 2007/0112714 A1* | 5/2007 | Fairweather | G06F 8/427 706/46 |
| 2007/0130621 A1 | 6/2007 | Marinescu et al. | |
| 2007/0136282 A1 | 6/2007 | Takashima | |
| 2007/0174630 A1 | 7/2007 | Shannon et al. | |
| 2007/0240218 A1 | 10/2007 | Tuvell et al. | |
| 2007/0240220 A1 | 10/2007 | Tuvell et al. | |
| 2007/0240221 A1 | 10/2007 | Tuvell et al. | |
| 2007/0240222 A1 | 10/2007 | Tuvell et al. | |
| 2008/0086773 A1 | 4/2008 | Tuvell et al. | |
| 2008/0168135 A1 | 7/2008 | Redlich et al. | |
| 2008/0177994 A1 | 7/2008 | Mayer | |
| 2008/0196104 A1 | 8/2008 | Tuvell et al. | |
| 2008/0256636 A1 | 10/2008 | Gassoway | |
| 2009/0144823 A1 | 6/2009 | Lamastra et al. | |
| 2009/0217260 A1 | 8/2009 | Gebhart et al. | |
| 2009/0319796 A1 | 12/2009 | Kim et al. | |
| 2010/0011029 A1 | 1/2010 | Niemela | |
| 2011/0116637 A1 | 5/2011 | Schiefelbein | |
| 2011/0179484 A1 | 7/2011 | Tuvell et al. | |
| 2011/0258701 A1 | 10/2011 | Cruz et al. | |
| 2011/0314542 A1 | 12/2011 | Viswanathan et al. | |
| 2011/0314548 A1 | 12/2011 | Yoo | |
| 2012/0008529 A1 | 1/2012 | Averbuch et al. | |
| 2012/0023584 A1 | 1/2012 | Yoo | |
| 2012/0036572 A1 | 2/2012 | Yoo | |
| 2012/0042375 A1 | 2/2012 | Yoo | |
| 2012/0117203 A1 | 5/2012 | Taylor et al. | |
| 2012/0222123 A1 | 8/2012 | Williams et al. | |
| 2013/0073388 A1 | 3/2013 | Heath | |
| 2014/0059226 A1* | 2/2014 | Messerli | G06F 9/5072 709/226 |
| 2014/0181894 A1 | 6/2014 | Bokern et al. | |
| 2014/0237550 A1* | 8/2014 | Anderson | H04L 9/3213 726/3 |
| 2014/0283071 A1 | 9/2014 | Spikes | |
| 2014/0337234 A1 | 11/2014 | Tang et al. | |
| 2015/0156183 A1 | 6/2015 | Beyer et al. | |
| 2015/0178497 A1 | 6/2015 | Lukacs et al. | |
| 2015/0271139 A1 | 9/2015 | Lukacs et al. | |
| 2015/0332043 A1 | 11/2015 | Russello | |
| 2015/0379287 A1 | 12/2015 | Mathur et al. | |
| 2016/0323315 A1 | 11/2016 | Hathaway et al. | |
| 2017/0063557 A1 | 3/2017 | Chalmandrier-Pema | |
| 2017/0068676 A1* | 3/2017 | Jayachandran | G06F 16/125 |
| 2017/0177877 A1 | 6/2017 | Suarez et al. | |
| 2017/0244748 A1 | 8/2017 | Krause et al. | |

OTHER PUBLICATIONS

Mattetti, Massimiliano et al. Securing the infrastructure and the workloads of linux containers. 2015 IEEE Conference on Communications and Network Security (CNS). https://ieeexplore.ieee.org/stamp/stamp.jsp?tp=&arnumber=7346869 (Year: 2015).*

Skillen, Adam; Mannan, Mohammad. Mobiflage: Deniable Storage Encryption for Mobile Devices. IEEE Transactions on Dependable and Secure Computing, vol. 11, Issue: 3. https://ieeexplore.ieee.org/stamp/stamp.jsp?tp=&arnumber=6682886 (Year: 2014).*

Linn, et al., "Protecting Against Unexpected System Calls", Department of Computer Science, University of Arizona, Tucson, AZ, 2005, url: https://www.usenix.org/legacy/events/sec05/tech/linn.html, pp. 239-254.

(56) References Cited

OTHER PUBLICATIONS

Cooper, et al., "Internet X.509 Public Key Infrastructure Certificate and Certificate Revocation List (CRL) Profile", May 2008, pp. 151.
Housley, et. al., "Internet X 509 Public Key Infrastructure Certificate and Certificate Revocation List (CRL) Profile", Apr. 2002, pp. 259.
Schneier, Bruce., "Economics of Information Security and Privacy III", 2013, pp. 73-109.
Kovatsch, el al., "A RESTful Runtime Container for Scriptable Internet of Things Applications", 3rd IEEE International Conference on the Internet of Things, Oct. 2012.
Mattetti, et. al., "Securing the Infrastructure and the Workloads of Linux Containers", IEEE Conference on Communications and Network Security (CNS), 2015.
Pan, el al., Robust Container Code Recognition System, Fifth World Congress on Intelligent Control and Automation 2004.
Cziva, et al., "Container-based Network Function Virtualization for Software-Defined Networks," 2015 IEEE Symposium on Computers and Communication (ISCC), pp. 415-420, Scotland.
Dhakchianandan, et al., "Memory Efficacious Pattern Matching Intrusion Detection System", 2013 International Conference on Recent Trends in Information Technology (ICRTIT), pp. 652-656, Anna University, Chennai, India.
Guenane, et al, "Autonomous Architecture for Managing Firewalling Cloud-Based Service," 2014 International Conference and Workshop on the Network of the Future (NOF), Paris, France, pp. 1-5.
Rehak, et al., "Adaptive Multiagent System for Network Traffic Monitoring," IEEE Intelligent Systems, vol. 24, Issue: 3, 2009, Czechia, pp. 17-25.
Shouman, et al., "Surviving Cyber Warfare With a Hybrid Multiagent-based Intrusion Prevention System," IEEE Potentials, vol. 29, Issue: 1, 2010, pp. 32-40.
Song, et al., "A Control Theoretical Approach for Flow Control to Mitigate Bandwidth Attacks," 2006 IEEE Information Assurance Workshop, West Point, NY, pp. 348-360.
Van Niekerk, et al., "Cloud-Based Security Mechanisms for Critical Information Infrastructure Protection," 2013 International Conference on Adaptive Science and Technology, South Africa, pp. 1-4.
Wang, et al., "Transport-Aware IP Routers: A Built-in Protection Mechanism to Counter DDoS Attacks," IEEE Transactions on Parallel and Distributed Systems, vol. 14, Issue: 9, pp. 873-884, Sep. 2003.
Zhauniarovich, et al., "MOSES: Supporting and Enforcing Security Profiles on Smartphones," IEEE Transactions on Dependable and Secure Computing, vol. 11, Issue: 3, pp. 211-223, 2014.
Balazsi, et al., "Software System for Broadcasting and Monitoring Traffic Information", 2014 IEEE 12th International Symposium on Intelligent Systems and Informatics (SISY), 2014, pp. 39-42, Subotica, Serbia.
Jing, et al., "A Context-aware Disaster Response System Using Mobile Software Technologies and Collaborative Filtering Approach", 2014 IEEE 18th International Conference on Computer Supported Cooperative Work in Design, 2014, pp. 516-522, China.

* cited by examiner

US 10,664,590 B2

FILESYSTEM ACTION PROFILING OF CONTAINERS AND SECURITY ENFORCEMENT

CROSS-REFERENCE TO RELATED APPLICATIONS

This application is a continuation-in-part of U.S. patent application Ser. No. 15/397,230 filed on Jan. 3, 2017, now pending, which claims the benefit of U.S. Provisional Patent Application Nos. 62/274,420 filed on Jan. 4, 2016, and 62/274,798 filed on Jan. 5, 2016. The Ser. No. 15/397,230 application is also a continuation-in-part (CIP) of:

a) U.S. patent application Ser. No. 15/278,700 filed on Sep. 28, 2016, now pending, which claims the benefit of U.S. Provisional Patent Application Nos. 62/235,644 filed on Oct. 1, 2015, and 62/235,641 filed on Oct. 1, 2015; and b) U.S. patent application Ser. No. 15/292,915 filed on Oct. 13, 2016, now pending, which claims the benefit of US Provisional Patent Application No. 62/241,812 filed on Oct. 15, 2015.

The contents of the above-referenced applications are hereby incorporated by reference.

TECHNICAL FIELD

The present disclosure generally relates to containerized applications, and more specifically to ensuring security and compliance for containerized applications.

BACKGROUND

A software container is an instance of a user-space running an application within the operating system (OS) of a host device (e.g., a server). Software containers enable operating-system-level virtualization in which the OS kernel allows the existence of multiple isolated software containers.

A software container (or a container) provides an executable environment with a complete filesystem. The filesystem may contain code, runtime, system tools, system libraries, and so on. That is, execution of a software container can be the same regardless of the underlying infrastructure. A Docker is one popular existing platform for creating, migrating, managing, and deploying software containers.

A software container, unlike a virtual machine, does not require or include a separate operating system. Rather, the container relies on the kernel's functionality and uses hardware resources (CPU, memory, I/O, network, etc.) and separate namespaces to isolate the application's view of the operating system. A software container can access the OS kernel's virtualization features either directly or indirectly. For example, Linux kernel can be accessed directly using the libcontainer library or indirectly using the libvirt service.

As demonstrated in FIG. 1, a number of software containers (i.e., the app containers 110-1 through 110-n, hereinafter referred to individually as a container 110, merely for simplicity purposes) can access and share the same OS kernel 120. However, each container 110 can be constrained to only use a defined amount of hardware resources (e.g., CPU, memory, etc.) in the underlying hardware layer 130. Thus, using software containers, hardware resources can be isolated, services can be restricted, and processes can be provisioned to have an almost completely private view of the operating system with their own process ID space, file system structure, and network interfaces.

FIG. 2 illustrates a typical structure of a software container 200. The software container 200 includes a base image 210 and a container layer 220. The base image 210 includes one or more image layers 215-1 through 215-$q$ (hereinafter referred to individually as a layer 215 and collectively as layers 215, merely for simplicity purposes). The layers 215 are read-only layers that represent filesystem differences. That is, the layers 215 are stacked on top of each other to form a base for the container's 200 root filesystem. The layers 215 are read only, and each layer 215 is identified by a randomly generated identifier number of a checksum computed using a hash function. All layers 215 and the base image 210 are collectively referred to a "container image").

The base image 210 (and its layers 215) can be shared across different software containers. Thus, only the container layer 220 differentiates between one software container and another. The container layer 220 is a readable and writable layer where all data written to the software container 200 is saved in the container layer 220. When the software container 200 is deleted, the writable container layer 220 is also deleted, and the base image 210 remains unchanged. As such, the software container 200 and other software containers (not shown) can share access to the same base image 210, where each software container has its own data state. In the example demonstrated in FIG. 2, the software container 200 is a Docker container (e.g., compliant with the Docker platform).

The popularity of software containers has been increased due to the easy integration with cloud-computing platform (e.g., Amazon® Web Services, Google® Cloud Platform, Microsoft® Azure, etc.). On such platforms, service providers can offer operating systems to run services and applications. With that said, the increasing reliance on software containers increases the need for secured execution.

Container images are typically uploaded and stored in image registries that may or may not be managed by an organization. Further, the base images are used across many container images. As such, base images can be developed and uploaded to image registries by programmers who are associated with the organization seeking to use the image. Therefore, hackers can take advantage of program images to include malicious code. Thus, such images can be vulnerable when integrated in a software container. Such malicious code may carry any type of malware including, for example, computer viruses, worms, Trojan horses, ransomware, spyware, adware, scareware, and the like. Further, such malicious code may be a source for an ATP attack or a distributed denial of service (DDoS) attack when a software container is executed with an infected or malicious image.

To limit the risk associated with container images stored in registries, several security and/or auditing processes can be performed prior to uploading a container image in a register. However, such processes are very limited in the type of vulnerabilities that they can check. Further, a container image determined to be safe can be later modified by a hacker (or an innocent programmer) to include code that can harm the execution environment.

Typically, a software container (and, thus, each application) can be secured separately from other software containers (and applications) during runtime execution. Thus, one software container cannot access resources of other software containers. However, the isolation of software containers cannot prevent the execution of malicious code. Malicious activity by software containers can occur through exploitation of legitimate programs or services in a container and improper configuration. Improper configuration may result in, for example, privilege escalations. Detection of such vulnerabilities occurs only at runtime, i.e., during the execution of the software containers.

Existing security solutions are not designed to detect vulnerabilities in images of software containers. Specifically, images have a certain structure that cannot be processed by existing security solutions. Further, existing solutions cannot determine or predict how the container image (being a static file) would behave when it is being executed. For example, a conventional antivirus tool cannot scan container images to detect, e.g., which folders are used for writing files or which types of files are to be written to each folder.

It would therefore be therefore advantageous to provide a solution that would secure the execution of software containers.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for securing execution of software containers using security profiles. The method comprises receiving an event indicating that a container image requires profiling, wherein the container image includes resources utilized to execute a corresponding application container; generating a security profile for the container image when the event is received, wherein the generated security profile indicates at least a list of permissible filesystem actions, wherein each permissible filesystem action is an action performed with respect to at least one filesystem resource; monitoring an operation of a runtime execution of the application container; and detecting a violation of the security profile based on the monitored operation.

Certain embodiments disclosed herein also include a non-transitory computer readable medium having stored thereon causing a processing circuitry to execute a process, the process comprising: receiving an event indicating that a container image requires profiling, wherein the container image includes resources utilized to execute a corresponding application container; generating a security profile for the container image when the event is received, wherein the generated security profile indicates at least a list of permissible filesystem actions, wherein each permissible filesystem action is an action performed with respect to at least one filesystem resource; monitoring an operation of a runtime execution of the application container; and detecting a violation of the security profile based on the monitored operation.

Certain embodiments disclosed herein also include a system for securing execution of software containers using security profiles. The system comprises a processing circuitry; and a memory, the memory containing instructions that, when executed by the processing circuitry, configure the system to: receive an event indicating that a container image requires profiling, wherein the container image includes resources utilized to execute a corresponding application container; generate a security profile for the container image when the event is received, wherein the generated security profile indicates at least a list of permissible filesystem actions, wherein each permissible filesystem action is an action performed with respect to at least one filesystem resource; monitor an operation of a runtime execution of the application container; and detect a violation of the security profile based on the monitored operation.

Certain embodiments disclosed herein also include a method for creating a security profile for a software container, comprising: receiving an event indicating that a container image requires profiling, wherein the container image includes resources utilized to execute a corresponding application container; and generating a security profile for the container image when the event is received, wherein the generated security profile indicates at least a list of permissible filesystem actions, wherein each permissible filesystem action is an action performed with respect to at least one filesystem resource.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
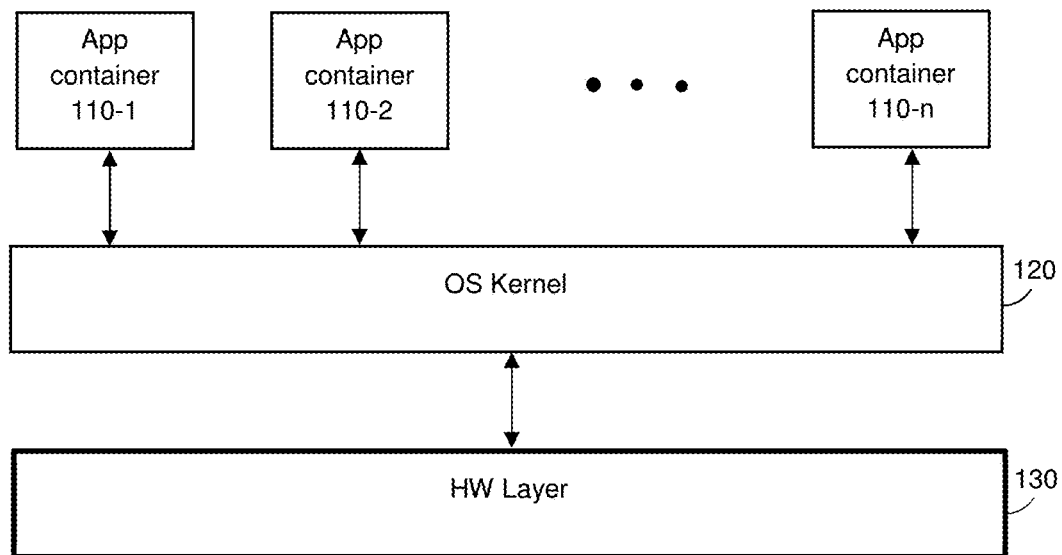
FIG. 1 is a diagram illustrating of execution of a plurality of software containers.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example, the various disclosed embodiments include a method and system for profiling and securing execution of software containers using security profiles. A security profile is created for a software container based on permissible (whitelisted) filesystem actions for the software container. Such permissible filesystem actions may be determined based on the context of the application executed the APP container. Each such action defines which filesystem resources can be accessed by the APP container during runtime. A filesystem resource may be, but is not limited to, a file, a directory, a sub directory, a memory page, a cache section, a folder, a volume, a library, a secret, and so on. The security profile may further include impermissible (blacklisted) filesystem actions.

In an embodiment, the security profile is created based on static analysis of all layers in a container image prior to runtime of an APP container. To this end, an application to be executed by the APP container, a configuration for the application, one or more environmental variables, or a combination thereof, are analyzed to determine permissible filesystem actions for the APP container. A container image is a static file and a runtime instance of the container image is an APP container. Alternatively or collectively, the security profile may be created based on static analysis of common files to be used by the APP container at runtime.

In another embodiment, the security profile is created based on behavioral analysis of the APP container at runtime. During a learning phase, an access pattern is learned. The access pattern is a pattern of filesystem actions such as read, write, and open. In yet another embodiment, both static analysis and runtime learning may be utilized to create the security profile for an APP container, for example by including permissible filesystem actions determined based on both container image analysis and runtime learning of access patterns in the security profile.

In an embodiment, the execution of the APP container is monitored to enforce the security profile. The enforcement includes detection of any breach of the security profile based on a security policy, and may further include performing one or more mitigation actions. The various embodiments will be discussed in greater detail below.

Figure 3:
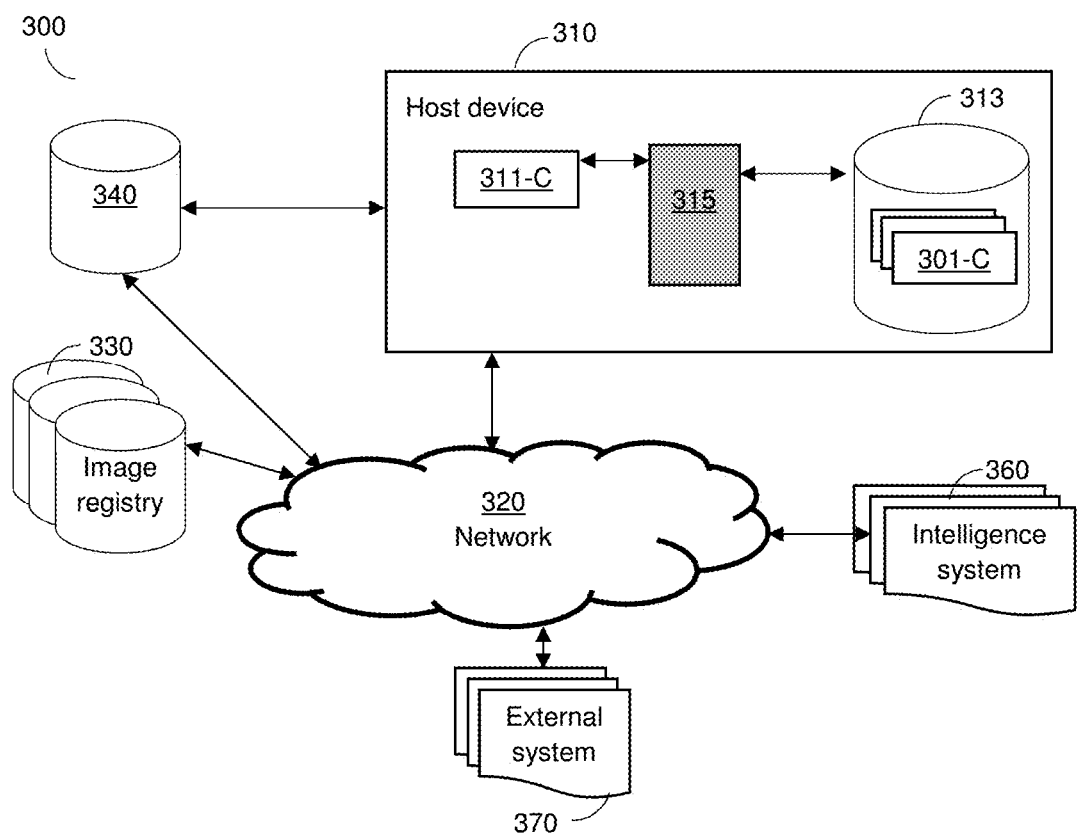
FIG. 3 is a network diagram utilized to describe the various disclosed embodiments.

FIG. 3 is an example network diagram 300 utilized to describe the various disclosed embodiments. A host device 310 is communicatively connected to a network 320. The host device 310 can be realized as a physical machine, a virtual machine, or a cloud infrastructure (IaaS). Examples for such a cloud infrastructure include, but are not limited to, Amazon Web Services (AWS), Cisco® Metapod, Microsoft Azure®, Google® Compute Engine (GCE), Joyent®, and the like. The host device 310 may be deployed in a datacenter, a cloud computing platform (e.g., a public cloud, a private cloud, or a hybrid cloud), on-premises of an organization, or in a combination thereof. The network 320 may be the Internet, the world-wide-web (WWW), a local area network (LAN), a wide area network (WAN), a metro area network (MAN), and other networks.

Figure 2:
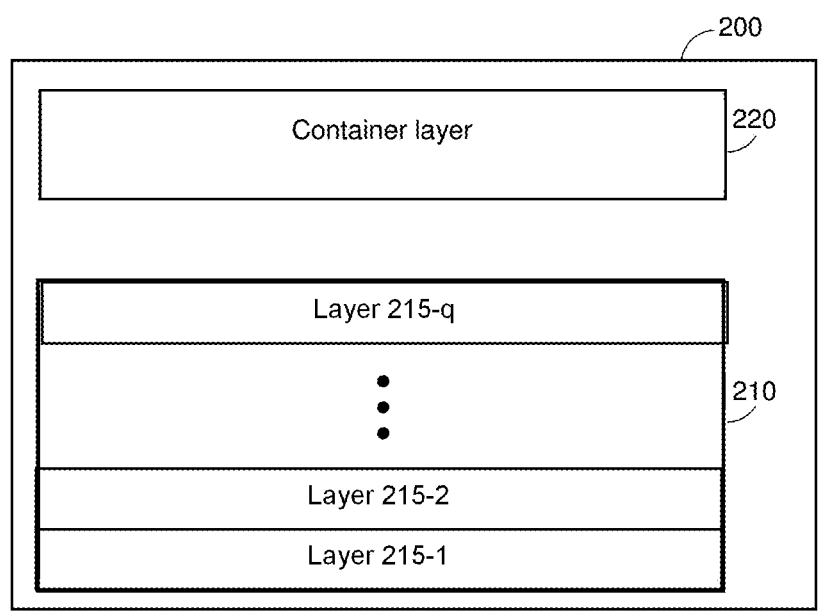
FIG. 2 is a diagram illustrating a structure of a software container.

Also connected to the network 320 is one or more image registries 330 (collectively referred to hereinafter as image registries 330 and individually as an image registry 330, merely for simplicity purposes). Each image registry 330 stores container images (not shown) that can be imported and executed on the host device 310. An example container image is shown in FIG. 2.

An image registry 330 may be, but is not limited to, Docker Hub, Google Container Registry, Amazon EC2 Container Registry, Artifactory, and the like. The image registry 330 is a data repository that allows programming and testing of container images. An image registry 330 typically provides a centralized resource for discovery, distribution, management, and collaboration of base images. An image registry 330 may be a cloud-based registry service or may be on-premises. In certain configurations, container images can be locally stored at the host device 310, e.g., in a registry 313.

According to the disclosed embodiments, the host device 310 is configured to host and execute a detector container 315. The detector container 315 is a software container designed to profile container images stored in the registries 330 and to enforce a secured execution of a respective APP container based on security profiles. For example, a registry 313 includes a container image 301-C, where the runtime instance of this image is an APP container 311-C.

In an embodiment, the host device 310 (and the detector container 315) are configured to interface with a continuous integration (CI) system (not shown). Typically, a CI system allows for building, testing, and uploading of container images to the image registries 330. Examples for such a CI system include Jenkins®, Appveyor®, TeamCity, Bamboo, and the like. In an example embodiment, the interface between the host device 310 and the system may be realized as an API or a plugin. The host device 310 may also be communicatively connected to a database 340 storing generated security profiles, polices, and data utilized to profile the container images.

In an optional deployment, the host device 310 is communicatively connected to one or more intelligence systems 360 through the network 320. The intelligence systems 360 may include common vulnerabilities and exposures (CVE®) databases, reputation services, security systems (providing feeds on discovered threats), and so on. The information provided by the intelligence systems 360 is utilized to detect certain vulnerabilities, to profile the container images, or both.

The host device 310 may be communicatively connected to one or more external systems 370 through the network 320. Examples for such external systems 370 may include, but are not limited to, an active directory of an organization to retrieve user permissions, access control systems (e.g., Docker Swarm, and Kubernetes management plane), SIEM systems to report on detected vulnerabilities, audit and compliance systems, and the like.

According to the disclosed embodiments, the detector container 315 is configured to receive an event indicating that a container image in one of the image registries 330 has been changed or added. The event includes at least a source of the image (e.g., a registry's network address or a check-in system) and an identifier of the container image to be checked. In some embodiments, the event may be generated by the host device 310 when a new base image is uploaded to the host or when an image locally stored in the host device 310 is modified. As discussed above, the container image includes a container layer (e.g., the layer 210, FIG. 2) which sets the application executed by a container and a plurality of image layers (e.g., the layers 215, FIG. 2), each of which is uniquely identified. Each container image may be assigned a unique identifier, which may be computed as a check-sum or hash value computed over the contents of the layer.

In an embodiment, upon receiving an event, the respective container image is downloaded to the host device 310 (e.g. a container image 301-C) and a security profile is generated for the container image. A security profile is generated through static analysis of the various layers, that is, without execution of the container image 301-C. The profiling process will be discussed with reference to the container image 301-C. In an optional embodiment, the container image 301-C is reformatted into a data structure that can be processed. For example, the container image 301-C may be reformatted to be, but is not limited to, a file having a standard format, a TAR (Tape ARchive) file, and the like.

In an embodiment, the detector container 315 is configured to profile filesystem actions permissible by the container image 301-C. Such permissible filesystem actions may also be determined based on the context of the application executed the APP container. Each filesystem action defines which filesystem resources can be accessed by the APP container during runtime. A filesystem resource may include a file, a directory, a sub directory, a memory page, a cache section, a folder, a volume a library, a secret (e.g., a secret key, a token, a certificate, etc.), and so on.

In an embodiment, such resources and, thus, permissible filesystem actions, are determined based on an analysis of processes to be executed by the APP container (311-C) of the respective container image 301-C. For example, if a process "myCode" includes an instruction to write to a directory "myFiles", the security profile of the container image 301-C would designate "write to myFiles" as a permissible filesystem action.

In an embodiment, the permissible filesystem actions may be determined based on types of programs accessing or accessed by known applications matching the application of the APP container 311-C. Example programs that may access or be accessed by an application of the APP container 311-C may include, but are not limited to, MongoDB, Apache, MySQL, CMDLine, and the like. Each program may have one or more known folders, one or more files, or both, that are to be used for that program. As a non-limiting example, the program MongoDB may be configured to write only database files to a predetermined folder.

To this end, the detector container 315 may be configured to analyze the container image 301-C to identify programs written in any scripting language (e.g., Python, Ruby, JavaScript, etc.) or programming language (e.g., C, C+, Java, etc.). For each identified program (or a piece of code), the detector container 315 is configured to identify filesystem actions used by the identified programs. As non-limiting examples, the permissible filesystem actions for a program may include writing to one or more specific folders, writing only certain types of files, accessing certain volumes, filesystem actions used with respect to certain volumes (e.g., the filesystem actions may include reading for a read-only volume and opening for an execute-only volume).

Alternatively or collectively, the permissible filesystem actions may be determined based on the specific filesystem resources being accessed. As a non-limiting example, if a volume is defined as read-only, the permissible filesystem actions for accessing that volume include only read actions.

In an embodiment, the security profile is determined based on analysis of heuristics for the APP container 311-C. Such heuristics may include, but are not limited to, file permissions, correlation of file types with processes requesting access, privileged folders that should only be accessible to an admin, access patterns determined based on static analysis of common filesystem resources and parameters, a combination thereof, and the like.

As an example for file permissions, a file may be read-only such that any attempt to write to the file may be considered a violation of the security profile. As an example for correlation of file types with processes, SSH keys may only be allowed to be read or written to by an admin such that attempts to read or write an SSH key by a non-admin process are considered violations of the security profile. As an example for privileged folders, a set of folders in the operating system program (e.g., "/dev") may only be accessed by an admin such that any process attempting to read or write to a privileged folder is considered a violation of the security profile.

As non-limiting examples for determining access patterns static analysis of common filesystem resources and parameters, such access patterns may be determined based on configuration files (e.g., nginx configuration, clustering environment configuration, etc.), specific attributes in configuration files (e.g., which folders and file types are to be used for different types of processes), secrets (e.g., secret keys, tokens, certificates, etc.), journal files (e.g., databases, logs, etc.), binary files, shared libraries, and the like. The secrets may be identified by, for example, checking a magic number, extensions, content entropy, or a combination thereof. As a non-limiting example, a non-Mongo process performing a read action from a Mongo journal file may be considered a violation of the security profile.

With respect to binary files, determining the access pattern may include detecting whether a binary is written to a disk or accessed, and a type of the binary is identified. Further, it may be determined whether the binary is benign or malicious based on, but not limited to, ELF attributes (e.g., whether the binary has symbols, whether the binary is statically compiled, etc.), whether the binary is a packed binary, whether the binary opens a non-executable shared library with executive permissions, a combination thereof, and the like.

In an embodiment, prior to generating a new security profile for a container image 311, it is checked, using its identifier, if a security policy was already generated for that container image. If so, the profiling process includes updating the contents of the existing security profile.

As noted above, in an embodiment, the generation and updating of a security profile may be performed as an offline process, that is, prior to executing the respective APP container. In another embodiment, generation or updating of a security profile can be performed as an online process, that is, at runtime during a predefined learning period (e.g., 1 hour after a first launch of the container). During the learning period, the detector container 315 is configured to monitor the operation of the APP container 311-C to learn access patterns for the APP container 311-C.

In an embodiment, each learned access pattern defines parameters of filesystem actions performed by the APP container 311-C during the learning phase. To this end, an access pattern may include, but is not limited to, specific filesystem resources accessed (e.g., a particular folder), types of files accessed (e.g., logs, executables, archives, etc.), an access rate (e.g., a read rate, a write rate, etc.), and the like In an embodiment, the detector container 315 is configured to enforce the security profiles based on a security policy. The security policy may define the mitigation action to be performed upon detection of a breach, the severity of each breach, whether or not a security profile should be completed in order to enforce or launch a container, a combination thereof, and the like. A security policy may be defined individually for each container image or for a group of container images.

In an embodiment, enforcement of a security policy generated for a container is executed in the host 310. For example, execution of the APP container 311-C from the container image 301-C. To this end, the detector container 315 is configured to monitor events (or system calls) indicative of instantiation, running, or both, of a new APP container (e.g., the container 311-C). The execution of an APP container 311-C is monitored at least by access attempts.

Specifically, any filesystem action that is attempted to be performed during the runtime of the APP container 311-C is captured and compared against the permissible filesystem actions as defined in the security profile. For example, an attempt to access a directory not defined as a permissible action would be considered as a violation of the security profile. As another example, an attempt to write to a volume indicated as read-only in the security profile may be determined to be a violation of the security profile.

Upon detecting a violation of the security profile, an enforcement (or mitigation) action may be performed. In an embodiment, the enforcement action to be taken is defined in the security profile. An enforcement action may include generating an alert, halting the operation of the APP container, halting or disabling the execution of a process, quarantining the APP container, preventing a filesystem action (i.e., prevent a process from reading, writing, or executing one or more files in one or more folders) and so on.

The enforcement actions may be defined with respect to different parameters, fields, or both, in the security profile. For example, any violation of a first permissible filesystem action would be reported, but a violation of a second permissible filesystem action would halt the APP container's execution. A security policy may be defined by a user (e.g., a system administrator) based on the application context of an APP container, the deployment environment, and so on.

In an embodiment, execution of an APP container (e.g., the APP container 311-C) may be performed in a quarantined environment, thereby protecting the host device 310. This embodiment is further discussed in the U.S. patent application Ser. No. 15/278,700, assigned to the common assignee, the contents of which are hereby incorporated by reference.

Figure 4:
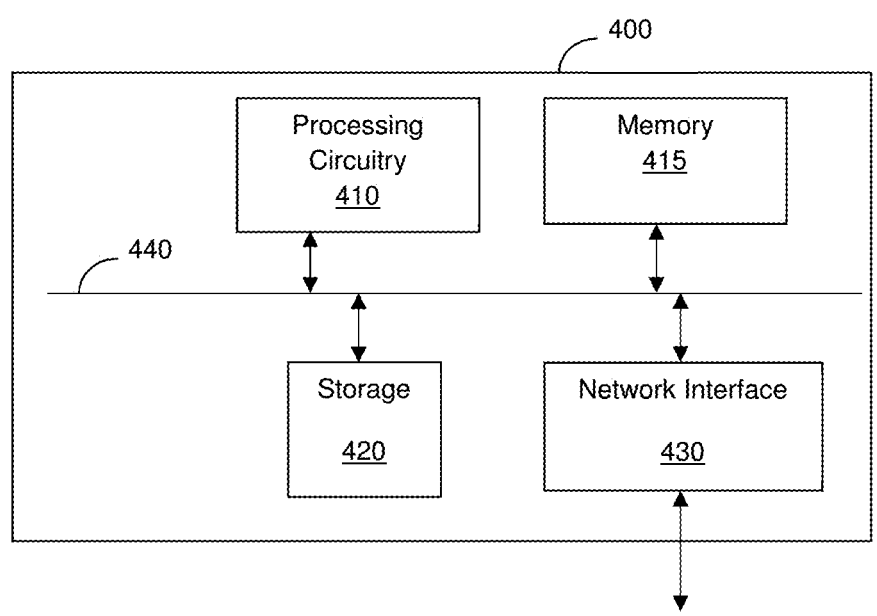
FIG. 4 is a block diagram of a hardware layer in host devices utilized to execute at least a detector container according to an embodiment.

It should be appreciated that the host device requires an underlying hardware layer to execute the OS, VMs, and software (APP) containers. An example block diagram of a hardware layer 400 is shown in FIG. 4. The hardware layer 400 includes a processing circuitry 410, a memory 415, a storage 420, and a network interface 430, all connected to a computer bus 440.

The processing circuitry 410 may be realized by one or more hardware logic components and circuits. For example, and without limitation, illustrative types of hardware logic components that can be used include Field Programmable Gate Arrays (FPGAs), Application-specific Integrated Circuits (ASICs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory may be volatile, non-volatile, or a combination thereof. The storage may be magnetic storage, optical storage, and the like.

In one configuration, computer readable instructions to implement one or more of the embodiments disclosed herein may be stored in the storage. The storage may also store other computer readable instructions to implement an operating system, an application program, and the like. Computer readable instructions may be loaded in the memory for execution by the processing circuitry 410.

In another embodiment, the storage 420, the memory 415, or both, are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing system 410, cause the processing system 510 to perform the various functions described herein with respect to at least profiling container images and enforcing secured execution of their respective APP containers based on the profiles.

The network interface 430 allows communication with other external systems or host devices through a network (e.g., the network 320). The network interface 430 may include a wired connection or a wireless connection. The network interface 430 may transmit communication media, receive communication media, or both. The computer bus 440 may be, for example, a PCIe bus.

Figure 5:
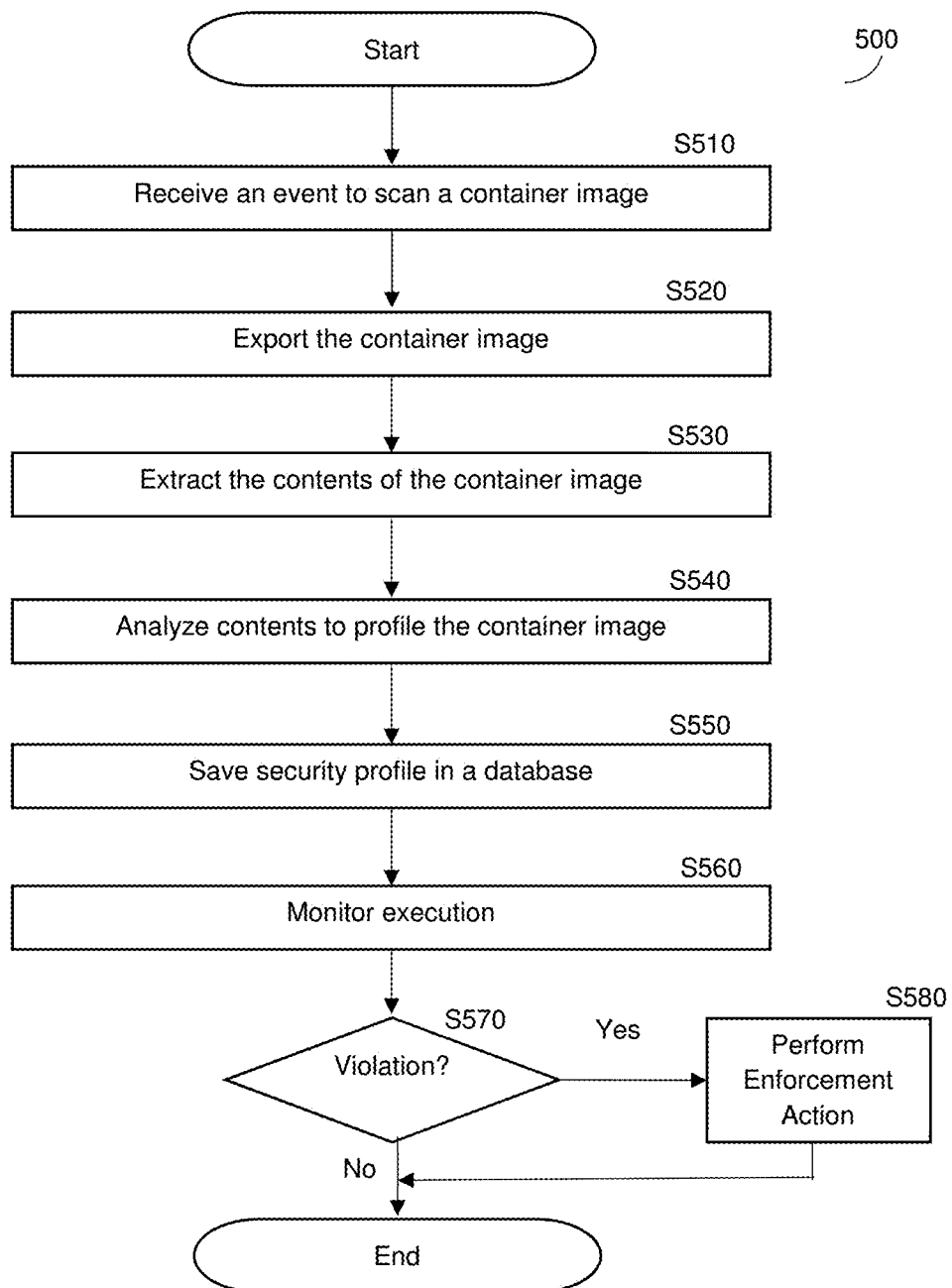
FIG. 5 is a flowchart illustrating a method for static profiling and securing execution of a container according to an embodiment.

FIG. 5 shows an example flowchart 500 illustrating a method for profiling container images and enforcing secured execution of the respective APP containers according to an embodiment. In an embodiment, the method is performed by the detector container 315.

At S510, an event indicating that a container image should be scanned is received. Such an event can be received from a continuous integration system, an image registry, and the like. The event may designate a specific container image or a group of images (each of which identified by their unique identifier) and the source of the image(s) to be scanned. For sake of simplicity of the discussion, the example flowchart 500 is discussed with respect to receiving a single event of single container image and enforcing a single corresponding APP container. It should be noted that additional events may be received without departing from the scope of the disclosure. Further, multiple container images and APP containers can be processed in parallel.

At S520, the container image (e.g., the container image 301-C, FIG. 3) to be scanned is exported from its source to the device hosting the detector container. It should be emphasized that exporting the container image does not require executing the image on the host device.

At optional S530, the contents of the container image are extracted. Specifically, the contents of each layer in the container image may be extracted. In an embodiment, the extraction includes reformatting the container image into a data structure that can be processed.

At S540, the contents of the container image are analyzed to generate a new security profile. In some implementations, S540 may include updating an existing security profile. As discussed above, the security profile is generated to include at least permissible filesystem actions. Static profiling of a container image is discussed above and is further demonstrated in FIG. 6.

At S550, the new or updated security profile is saved in a database, indexed based on the respective container image identifier. The profiling of a container image is typically performed prior to runtime. As noted above, a generated security profile can also be updated at runtime during a predefined learning period, for example, by re-analyzing the container contents, or by monitoring port usage during a learning phase as described herein below with respect to FIG. 7.

At S560, the method transitions to an enforcement mode, upon receiving an event indicative of instantiation, running, or both, of a new APP container. An APP container (e.g., the APP container 311-C. FIG. 3) is a runtime instance of a corresponding container image (e.g., the container image 301-C, FIG. 3). In an embodiment, S560 includes retrieving the respective security profile; capturing filesystem actions; and analyzing the captured filesystem actions to detect an attempt by the APP container to violate any parameter sets in the retrieved security profile. The analysis may include comparing parameters of the access attempts to the permissible filesystem actions indicated in the security profile.

At S570, it is checked if the retrieved security profile has been violated and, if so, execution continues with S580. where an enforcement action is performed. Otherwise, execution terminates.

As discussed above, the enforcement action may be determined based on a security policy, the type of the detected violation, or both. The endorsement action may include, for example, generating an alert (or security event), halting the operation of the APP container, quarantining the APP container or the infected file, and so on. The alert may include an APP container identifier, a name of the infected process, information of the detected violation, and so on. The enforcement of the security policy is performed at runtime.

Figure 6:
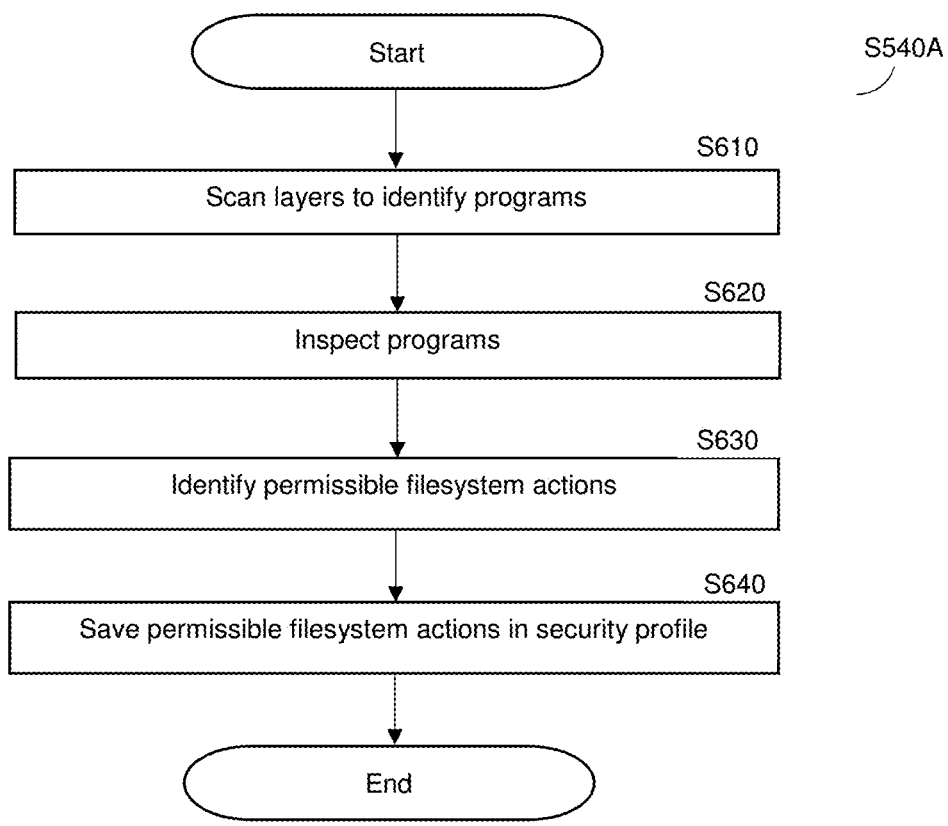
FIG. 6 is a flowchart illustrating a method for container image profiling according to an embodiment.

FIG. 6 shows an example flowchart S540 illustrating static filesystem action profiling according to an embodiment. At S610, the contents of the container image (received at S520) are scanned to identify programs (or pieces of code). The program can be coded in any programming language, scripting language, or combination thereof. The scan may be performed across all layers of the container image.

At S620, each identified program is inspected. The may include determining an application to be executed by the container, a configuration for the application, one or more environmental variables, or a combination thereof.

At S630, permissible filesystem actions are identified. The permissible filesystem actions may be identified based on filesystem actions used by the identified programs. To this end, in an embodiment, S630 may include determining permissible filesystem actions with respect to accessing different filesystem resources. The permissible filesystem actions may be further defined with respect to programs that are permitted to perform each filesystem action. For example, a cluster admin user service may be permitted to read and write SSH keys while other programs are not.

In an embodiment, S630 may further include identifying permissible filesystem actions based on heuristics as described further herein above with respect to FIG. 3. To this end, S630 may further include analyzing contents of common files, secrets, indications of privileged folders, file permissions, file types, combinations thereof, and the like, as described further herein above.

At S640, the permissible filesystem actions are saved in the security profile.

Figure 7:
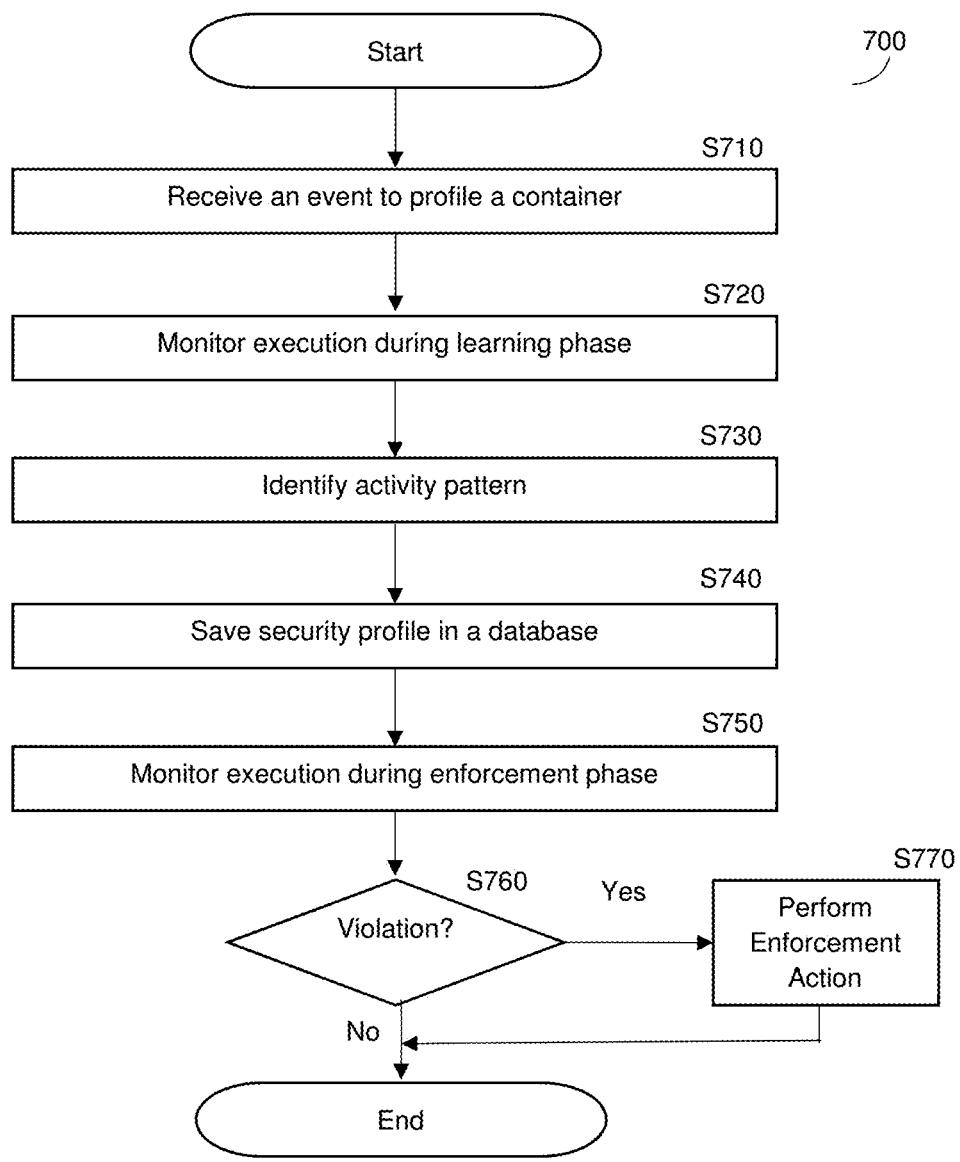
FIG. 7 is a flowchart illustrating a method for runtime profiling and securing execution of a container according to an embodiment.

FIG. 7 is an example flowchart 700 illustrating a method for profiling container images and enforcing secured execution of the respective APP containers according to another embodiment. In the embodiment described with respect to FIG. 7, the profiling is performed at runtime. In an embodiment, the method is performed by the detector container 315.

At S710, an event indicating that an APP container should be profiled is received. Such an event can be received from a continuous integration system, an image registry, and the like. The event may designate each APP container of a specific container image or group of container images.

At S720, during a learning phase, execution of the APP container is monitored. In an embodiment, S720 includes capturing filesystem actions attempted by the APP container. The learning phase occurs during a startup period after initialization of the APP container, and may be a predetermined period of time (e.g., 10 minutes).

At S730, based on the learning phase monitoring, an access pattern is identified. The access pattern may include, but is not limited to, specific folders accessed (e.g., "/etc"), types of tiles accessed (e.g., logs, executables, archives, etc.), read/write rate, a combination thereof, and the like.

At S740, a new or updated security profile is saved in a database, indexed based on the respective container image identifier. In the embodiment described with respect to FIG. 7, the profiling of a container image is typically performed during a learning phase after initialization of the APP container. A generated security profile may also be updated at runtime during a subsequent learning period.

At S750, the method transitions to an enforcement mode upon completion of the learning mode. In an embodiment, S750 includes retrieving the respective security profile; capturing filesystem actions attempted by the APP container; and analyzing the captured filesystem actions to detect violations of any parameter sets in the retrieved security profile. The analysis may include comparing any comparing the captured filesystem actions with the permissible filesystem actions.

At S760, it is checked if the retrieved security profile has been violated and, if so, execution continues with S770. where an enforcement action is performed. Otherwise, execution terminates.

As discussed above, the enforcement action may be determined based on a security policy, the type of the detected violation, or both. The endorsement action may include, for example, generating an alert (or security event), halting the operation of the APP container, quarantining the APP container or the infected file, and so on. The alert may include an APP container identifier, a name of the infected process, information of the detected violation, and so on. The enforcement of the security policy is performed at runtime.

It should be noted that FIGS. 5 and 7 are described as separate profiling processes merely for simplicity purposes, and that the static and runtime profiling techniques described herein may be integrated without departing from the scope of the disclosure. For example, permissible filesystem actions may be determined based on both static analysis of container contents and runtime analysis of container behavior.

It should be noted that various embodiments have been discussed herein with a reference to software containers. A software container provides an executable environment with a complete filesystem. A software container may include a micro-service, a Docker container, a light virtual machine, a serverless process, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for securing execution of software containers using security profiles, comprising:
   receiving an event indicating that a container image in a container image source requires profiling, wherein the container image includes resources utilized to execute an application container;
   exporting the container image to a host device from the container image source;
   generating a security profile for the container image when the event is received, wherein the generated security profile indicates at least a list of permissible filesystem actions, wherein each permissible filesystem action is an action performed with respect to at least one filesystem resource, wherein the security profile for the container image in the host device is generated without executing the container image on the host device, wherein the security profile is generated for the container image when the container image has been exported to the host device;
   monitoring an operation of a runtime execution of the application container; and
   detecting a violation of the security profile based on the monitored operation.

2. The method of claim 1, wherein generating the security profile further comprises:
   scanning contents of the container image to identify programs; and
   determining filesystem actions utilized by each identified program, wherein the permissible filesystem actions for each identified program include the filesystem actions utilized by the program.

3. The method of claim 1, wherein generating the security profile further comprises:
   monitoring, during a learning phase, the operation of the runtime execution of the application container, wherein the learning phase monitoring includes scanning access attempts by the application container, wherein the generated security profile includes an access pattern learned during the learning phase.

4. The method of claim 3, wherein the access pattern includes at least one of: at least one accessed folder, a file type of each of at least one accessed file, a read rate, and a write rate.

5. The method of claim 3, wherein the security profile is generated based further on at least one of: at least one common file, at least one secret, a shared library, and a list of privileged folders.

6. The method of claim 5, wherein the at least one common file includes at least one of: a configuration file, a journal file, and a binary file.

7. The method of claim 1, wherein the at least one filesystem resource includes at least one of: a file, a directory, a sub directory, a memory page, a cache section, a folder, a volume a library, and a secret.

8. The method of claim 1, further comprising:
   performing at least one enforcement action when a violation is detected, wherein the at least one enforcement action includes at least one of: generating an alert, halting the operation of the application container, and quarantining the application container.

9. A non-transitory computer readable medium having stored thereon instructions for causing a processing circuitry to execute a process, the process comprising:
   receiving an event indicating that a container image in a container image source requires profiling, wherein the container image includes resources utilized to execute an application container;
   exporting the container image to a host device from the container image source;
   generating a security profile for the container image when the event is received, wherein the generated security profile indicates at least a list of permissible filesystem actions, wherein each permissible filesystem action is an action performed with respect to at least one filesystem resource, wherein the security profile for the container image in the host device is generated without executing the container image on the host device, wherein the event is generated by the host device when the container image is exported to the host device, wherein the security profile is generated for the container image when the container image has been exported to the host device;
   monitoring an operation of a runtime execution of the application container; and
   detecting a violation of the security profile based on the monitored operation.

10. A system for securing execution of software containers using security profiles, comprising:
    a processing circuitry; and
    a memory, the memory containing instructions that, when executed by the processing circuitry, configure the system to:

receive an event indicating that a container image in a container image source requires profiling, wherein the container image includes resources utilized to execute an application container;

export the container image to a host device from the container image source;

generate a security profile for the container image when the event is received, wherein the generated security profile indicates at least a list of permissible filesystem actions, wherein each permissible filesystem action is an action performed with respect to at least one filesystem resource, wherein the security profile for the container image in the host device is generated without executing the container image on the host device, wherein the security profile is generated for the container image when the container image has been exported to the host device;

monitor an operation of a runtime execution of the application container; and detect a violation of the security profile based on the monitored operation.

11. The system of claim 10, wherein the system is further configured to:

scan contents of the container image to identify programs; and determine filesystem actions utilized by each identified program, wherein the permissible filesystem actions for each identified program include the filesystem actions utilized by the program.

12. The system of claim 10, wherein the system is further configured to:

monitor, during a learning phase, the operation of the runtime execution of the application container, wherein the learning phase monitoring includes scanning access attempts by the application container, wherein the generated security profile includes an access pattern learned during the learning phase.

13. The system of claim 12, wherein the access pattern includes at least one of: at least one accessed folder, a file type of each of at least one accessed file, a read rate, and a write rate.

14. The system of claim 12, wherein the security profile is generated based further on at least one of: at least one common file, at least one secret, a shared library, and a list of privileged folders.

15. The system of claim 14, wherein the at least one common file includes at least one of: a configuration file, a journal file, and a binary file.

16. The system of claim 10, wherein the at least one filesystem resource includes at least one of: a file, a directory, a sub directory, a memory page, a cache section, a folder, a volume a library, and a secret.

17. The system of claim 10, wherein the system is further configured to:

perform at least one enforcement action when a violation is detected, wherein the at least one enforcement action includes at least one of: generating an alert, halting the operation of the application container, and quarantining the application container.

18. A method for creating a security profile for a software container, comprising:

receiving an event indicating that a container image in a container image source requires profiling, wherein the container image includes resources utilized to execute a corresponding application container;

exporting the container image to a host device from the container image source when the event is received; and generating a security profile for the container image when the event is received, wherein the generated security profile indicates at least a list of permissible filesystem actions, wherein each permissible filesystem action is an action performed with respect to at least one filesystem resource, wherein the security profile for the container image in the host device is generated without executing the container image on the host device, wherein the security profile is generated for the container image when the container image has been exported to the host device.

* * * * *